United States Patent [19]
Swanson et al.

[11] 4,400,986
[45] Aug. 30, 1983

[54] LANDING GEAR ACTUATOR

[75] Inventors: David L. Swanson, Rockford; Dale E. Lyons, Belvidere, both of Ill.

[73] Assignee: Atwood Vacuum Machine Company, Rockford, Ill.

[21] Appl. No.: 227,244

[22] Filed: Jan. 22, 1981

[51] Int. Cl.³ .................. F16H 27/02; F16H 55/26; B60R 27/00
[52] U.S. Cl. .................. 74/128; 74/149; 74/160; 280/766.1
[58] Field of Search .......... 74/128, 146, 149, 160, 74/665 F; 66/237; 280/764, 766

[56] References Cited

U.S. PATENT DOCUMENTS

| 3,464,279 | 9/1969 | Halverson | 74/126 |
| 3,608,336 | 9/1971 | Phillips | 66/237 X |
| 3,861,648 | 1/1975 | Glassmeyer | 280/766 X |
| 4,018,094 | 4/1977 | Schmidt | 74/128 |
| 4,116,315 | 9/1978 | Vandenberg | 192/48 |
| 4,281,852 | 8/1981 | Konkle | 280/766 |

FOREIGN PATENT DOCUMENTS

| 699158 | 12/1964 | Canada | 280/764 |
| 1091779 | 10/1960 | Fed. Rep. of Germany | 74/149 |
| 59902 | 9/1938 | Norway | 74/149 |
| 95375 | 4/1939 | Sweden | 74/128 |

OTHER PUBLICATIONS

Brochure-Gear Mate-Northwest Manufacturing Corporation, (4 pages).
Brochure-Gear Mate-Northwest Manufacturing Corporation, (8 pages).

Primary Examiner—Wm. Carter Reynolds
Attorney, Agent, or Firm—Leydig, Voit, Osann, Mayer & Holt, Ltd.

[57] ABSTRACT

The legs of the landing gear of a semi-trailer may be automatically extended and retracted by a pneumatically operated actuator adapted to be connected to the crankshaft of the landing gear and adapted to rotate the cross-shaft of the landing gear selectively in either direction at a high or low speed. The crankshaft is rotated by gears and ratchets which are driven by pawls adapted to be reciprocated by an air-actuated cylinder and adapted to be alternately positioned in active and inactive positions. The flow of pressurized air to the cylinder is controlled by a cycle valve and an on-off valve, the latter being capable of turning off the actuator automatically when the legs are fully retracted.

6 Claims, 9 Drawing Figures

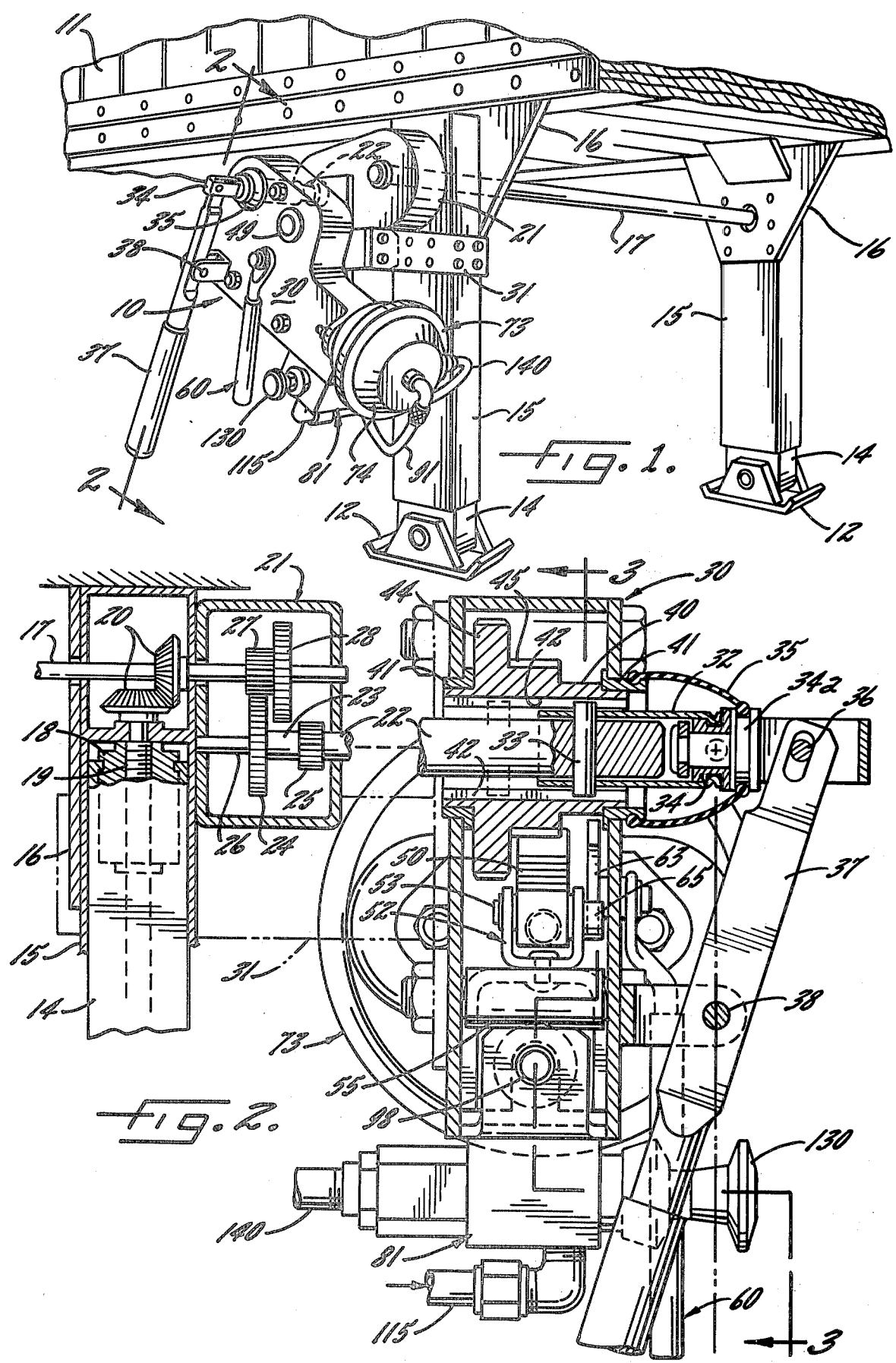

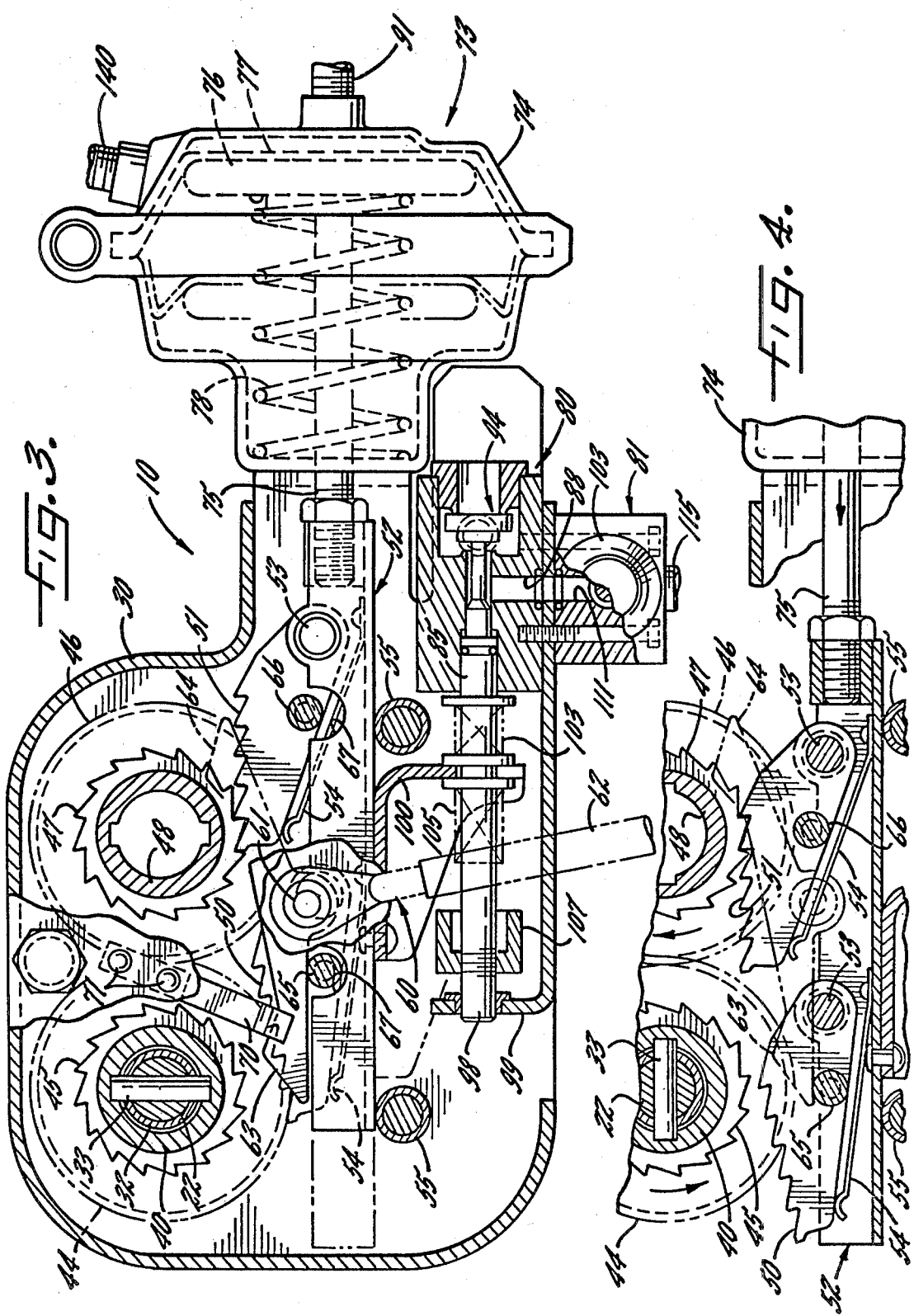

LANDING GEAR ACTUATOR

BACKGROUND OF THE INVENTION

This invention relates to an actuator for the landing gear assembly of the trailer of a tractor-trailer combination. Conventionally, such a trailer includes a pair of laterally spaced landing gear feet which extend downwardly from the front portion of the trailer and contact the ground to support the trailer in an elevated position when the trailer is detached from the tractor. When the trailer is attached to the tractor, the landing gear feet are retracted upwardly to prevent the feet from engaging the ground while the trailer is being towed by the tractor.

In most trailers, the landing gear feet are connected by a laterally extending cross-shaft which extends the feet when rotated in one direction and retracts the feet when rotated in the opposite direction. The cross-shaft usually is connected to a gear box located outboard of one of the feet and may be turned by a manually operated hand crank attached to the input shaft of the gear box.

It has been recognized that considerable time and effort is required to manually operate the hand crank. Accordingly, power-operated actuators have been provided to rotate the cross-shaft in either direction in order to extend or retract the landing gear feet. One such power-operated landing gear actuator is disclosed in Vandenberg U.S. Pat. No. 4,116,315 and rotates the cross-shaft with a reciprocating pneumatic actuator which is operated by the same source of pressurized air that is used to operate the brakes of the tractor-trailer combination. Another pneumatically operated landing gear actuator has been sold by Northwest Manufacturing Corporation of Camanche, Iowa under the trademark GEAR MATE.

SUMMARY OF THE INVENTION

The general aim of the present invention is to provide a new and improved landing gear actuator which, when compared with prior actuators, is of more compact, lightweight, reliable and economical construction.

A more detailed object is to achieve the foregoing by providing a landing gear actuator in which the reciprocating motion of the pneumatic actuator is converted to rotary motion by uniquely arranged ratchets, pawls and gears of relatively compact and simple construction.

The invention also resides in the provision of novel means for activating and inactivating the pawls to enable the reciprocating pneumatic actuator to selectively rotate the cross-shaft in either direction.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical trailer equipped with a new and improved landing gear actuator incorporating the unique features of the present invention.

FIG. 2 is an enlarged fragmentary cross-section taken substantially along the line 2—2 of FIG. 1.

FIG. 3 is a cross-section taken substantially along the line 3—3 of FIG. 2 and shows the actuator set to retract the landing gear feet.

FIG. 4 is a fragmentary view of parts illustrated in FIG. 3 and shows certain parts of the actuator in moved positions during retraction of the feet.

DETAILED DESCRIPTION OF THE PREFERRED EMBODIMENT

Figure 5:
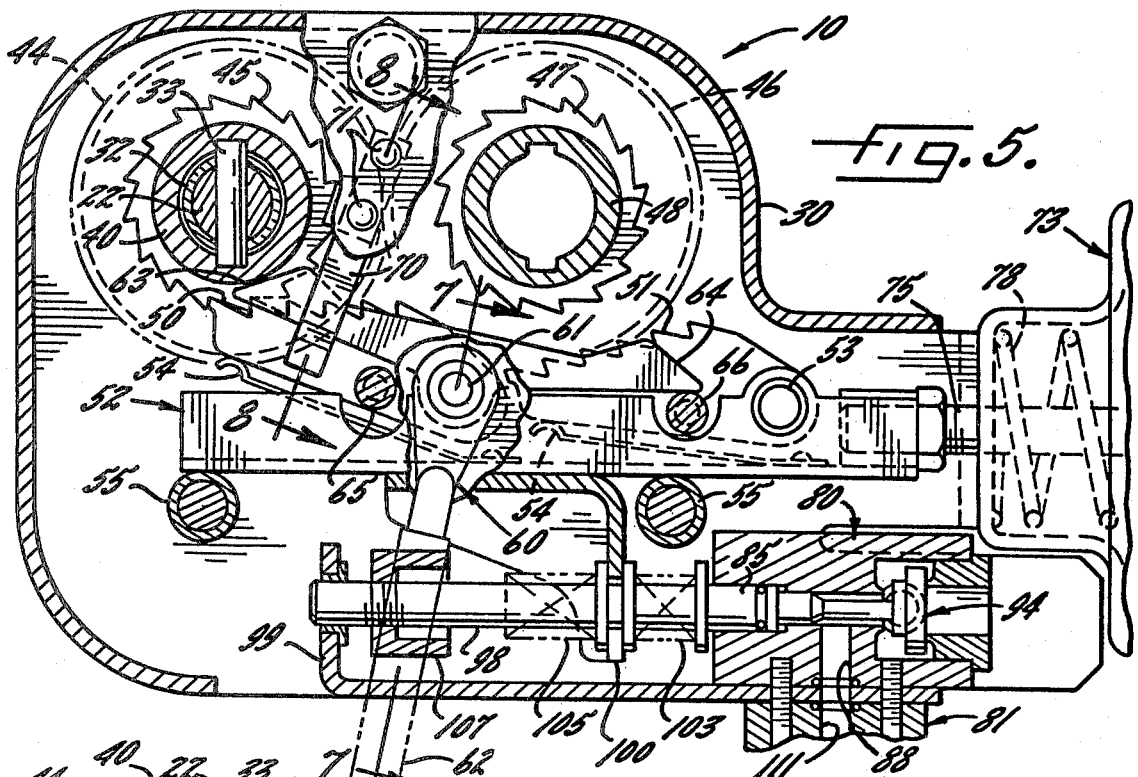
FIG. 5 is a view similar to FIG. 3 but shows the actuator set to extend the landing gear feet.

As shown in the drawings for purposes of illustration, the invention is embodied in an actuator 10 for extending and retracting the landing gear of the trailer 11 of a tractor-trailer combination (i.e., a semi). The landing gear forms part of the trailer itself and includes a pair of laterally spaced pads or feet 12. The latter are pivotally mounted on the lower ends of vertical legs 14 which are slideably received within upright sleeves 15 attached by mounting brackets 16 to the forward end portion of the trailer. The feet and the legs are retracted upwardly when the trailer is coupled to the tractor so as to prevent the feet from contacting the ground during towing of the trailer. When the trailer is to be uncoupled from the tractor, the feet and legs are extended downwardly to jack the trailer upwardly off of the "fifth wheel" of the tractor and to enable the trailer to stand alone.

A rotatable member in the form of a cross-shaft 17 extends laterally between the sleeves 15 near the upper end of the legs 14 and is effective to extend the legs when rotated in one direction and to retract the legs when rotated in the opposite direction. Various types of mechanisms may coact with the shaft to cause the legs to extend or retract when the shaft is rotated. In this particular instance, a nut 18 (FIG. 2) is attached rigidly to the upper end portion of each leg and is threaded onto a lead screw 19 which is rotatably journaled within the sleeve 15. Meshing bevel gears 20 are attached to the shaft 17 and to the upper end of the screw 19 and turn the screw in one direction or the other in dependence upon the direction of rotation of the shaft. As the screws are turned, the nuts either advance downwardly or upwardly so as to extend or retract the legs.

Conventionally, the cross-shaft 17 forms the output of a gear box 21 which is attached to the outboard side of one of the sleeves 15. The input of the gear box is formed by an outwardly extending crankshaft 22 (FIG. 2) whose inner end portion in this instance is formed by a sleeve 23. The latter carries large and small pinions 24 and 25 and is slideably mounted on a shaft 26 within the gear box 21. When the crankshaft 22 is pulled outwardly, the large pinion 24 meshes with a small pinion 27 on the cross-shaft 17 as shown in FIG. 2 so that, when the crankshaft is turned at a given speed, the cross-shaft is rotated at a faster speed but with a relatively low torque input. This is the high gear setting of the gear box 21 and usually is used to effect rapid retraction of the legs 14 when the trailer 11 is being lowered and the power requirements are low. When the legs are to be extended to lift the trailer, the crankshaft 22 is pushed inwardly to cause the sleeve 23 to slide inwardly on the shaft 26 and to bring the small pinion 25 on the sleeve into meshing engagement with a large pinion 28 on the cross-shaft 17. Upon rotation of the crankshaft with the gear box in its low gear setting, the cross-shaft is rotated at comparatively low speed but with a relatively high input torque to develop the power necessary to extend the legs and lift the trailer.

In many trailers, a hand crank (not shown) is attached to the outer end of the crankshaft 22 and may be manually turned to rotate the cross-shaft 17 and extend and retract the legs 14. To avoid the time and effort required to manually operate the crank, some trailers are equipped with power-operated actuators which are capable of rotating the cross-shaft in one direction or the other to effect automatic extension and retraction of the legs.

The present actuator 10 preferably is attached to and acts directly on the crankshaft 22. The actuator 10 includes a housing 30 preferably located outboard of the gear box 21 and adapted to be attached rigidly to the adjacent sleeve 15 by a mounting bracket 31 (FIG. 1). The outer end portion of the crankshaft 22 extends laterally through the side walls of the housing 30 and terminates outwardly of the outer side wall. A sleeve 32 (FIG. 2) is telescoped over the outer end portion of the crankshaft and is connected rigidly thereto by a pin 33 which extends radially through the sleeve and the crankshaft. A bushing 34 is secured tightly within the sleeve 32 and is adapted to rotate therewith. The bushing receives a coupling device 34a with rotatable clearance, the coupling device being partially surrounded by a flexible protective boot 35. Pivotally and slideably connected at 36 to the outer end portion of the coupling device 34 is a shift lever 37 which is pivotally connected near its mid-point to the outer side wall of the housing 30 as indicated at 38. When the shift lever is swung counterclockwise from the position shown in FIG. 2, it acts through the coupling device 34a, the bushing 34, the sleeve 32 and the pin 33 to push the crankshaft 22 inwardly and set the gear box 21 in low gear. Reverse swinging of the lever sets the gear box in high gear as shown in FIG. 2. Because of the bushing 34, rotation of the crankshaft 22 is not transmitted to the coupling device 34a and the lever 37.

A power-rotated member 40 (FIGS. 2 and 3) acts through the pin 33 to rotate the crankshaft 22 in either of two directions with the crankshaft acting through the gear box 21 and the cross-shaft 17 to extend or retract the legs 14. Herein, the member 40 is in the form of a tubular hub disposed within the housing 30 and rotatably journaled in sleeve bearings 41 which are supported by the side walls of the housing. The hub 40 is telescoped over the crankshaft 22 and the sleeve 32 and is formed with two diametrically spaced slots or keyways 42 which slideably receive the protruding ends of the pin 33. As a result of the pin and the keyways, rotation of the hub 40 is transmitted to the crankshaft 22 and yet, at the same time, the crankshaft is capable of sliding axially relative to the hub when the lever 37 is pivoted to shift the gear box 21 between high gear and low gear.

In accordance with the present invention, a gear 44 (FIGS. 2 and 3) is secured to the hub and preferably is formed integrally with the hub as shown in FIG. 2. A one-way ratchet wheel 45 (FIG. 3) is located alongside the gear and is formed integrally with the gear and the hub. Located within the housing 30 is a second gear 46 (FIG. 3) which meshes with the gear 44. A one-way ratchet wheel 47 is formed integrally with one side of the gear 46 and both are formed integrally with a hub 48 which is rotatably journaled in sleeve bearings 49 (FIG. 1) supported by the side walls of the housing 30. The ratchets 45 and 47 are disposed in a common plane and the teeth of each face in the same direction.

Coacting with the ratchets 45 and 47 are toothed members in the form of pawls 50 and 51 (FIG. 3), respectively, each having one edge formed with multiple teeth. Each pawl is mounted on a reciprocating drive member 52 to move substantially tangentially of its respective ratchet. In addition, each pawl is pivotally mounted on the drive member by a pivoted pin 53 and is adapted to swing upwardly and downwardly between active and inactive positions with respect to its ratchet. When each pawl is swung upwardly to its active position, its teeth contact the teeth of the associated ratchet (see, for example, the pawl 51 in FIG. 4). The teeth of each pawl are released from and are spaced downwardly from the teeth of the ratchet when the pawl is swung downwardly to its inactive position as indicated, for example, by the pawl 50 in FIG. 4. Cantilevered leaf springs 54 are located beneath the pawls and have free ends which bear against the undersides of the pawls near the free ends thereof to urge the pawls upwardly to their active positions. The opposite end of each spring is anchored to the upper surface of the bottom of the drive member 52. Herein, the drive member is in the form of a U-shaped channel whose bottom is supported by rollers 55 which span the side walls of the housing 30. The pawls are located between the side walls of the channel-shaped drive member 52.

Figure 7:
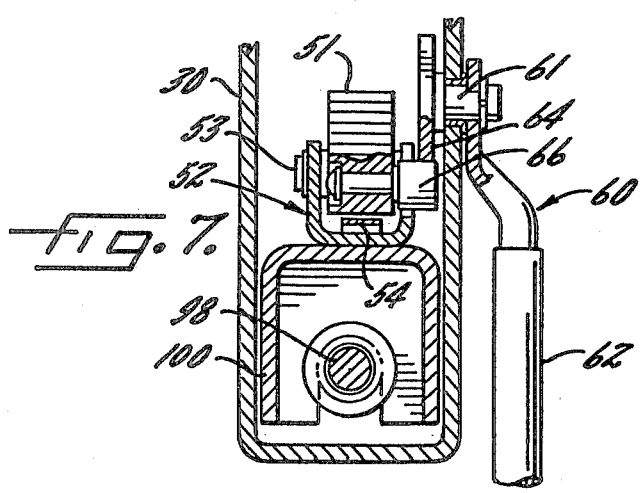
FIGS. 7 and 8 are enlarged fragmentary cross-sections taken substantially along the lines 7—7 and 8—8, respectively, of FIG. 5.
Figure 8:
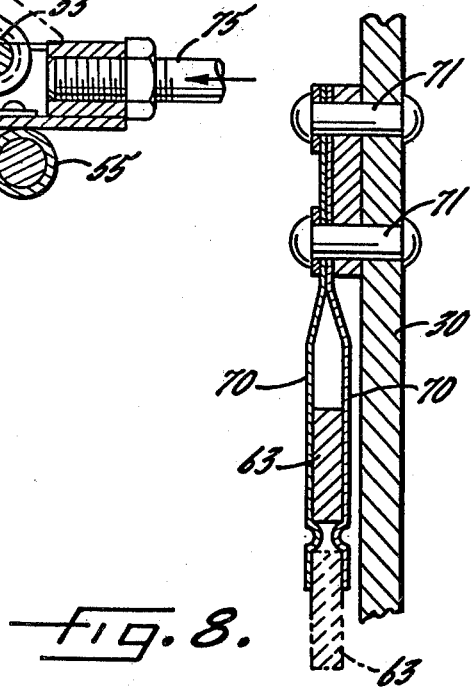

Means are provided for selectively shifting each of the pawls 50 and 51 between its active and inactive positions with one pawl being shifted to its active position when the other pawl is shifted to its inactive position. Herein, these means comprise a lever 60 (FIGS. 1 and 3) which is secured to a horizontal pin 61 (FIGS. 3 and 7), the latter being rotatably supported by the outer side wall of the housing 30. The outer end portion of the pin projects outwardly through the outer side wall and is connected rigidly to an elongated handle 62 which forms part of the lever. As shown in FIG. 3, the lever 60 also includes two oppositely extending arms 63 and 64 which overlie rollers 65 and 66 secured to and extending outwardly from the pawls 50 and 51, respectively. When the handle 62 is turned in a counterclockwise position to the position shown in FIG. 3, the arm 63 engages the roller 65 on the pawl 50 and cams that pawl downwardly to its inactive position, the roller being received within a notch 67 in the outer side of the drive member 52. At the same time, the arm 64 swings upwardly away from the roller 66 on the pawl 51 so as to enable the latter pawl to pivot upwardly to its active position under the urging of the underlying spring 54. Clockwise swinging of the handle to the position shown in FIG. 5 results in the arm 64 pressing the pawl 51 downwardly to its inactive position and in the arm 63 allowing the pawl 50 to spring upwardly to its active position. If the handle 62 is centered between the positions shown in FIGS. 3 and 5, the arms hold both pawls 50 and 51 in a neutral position in which neither pawl engages its associated ratchet 45 or 47. The handle is adapted to be held releasably in each of its positions by a latch which herein is formed by a pair of leaf springs 70 (FIG. 8). The springs are secured at 71 to the outer side wall of the housing 30 and their laterally spaced lower end portions straddle the arm 63. The frictional engagement between the springs 70 and the arm 63 provides a retarding force which holds the handle 62 in the position to which it is swung.

To reciprocate the drive member 52, a pneumatic actuator 73 is operably connected to one end of the drive member. In this instance, the pneumatic actuator comprises a cylinder 74 (FIGS. 1, 3 and 9) located outside of the housing 30 and secured to the forward end thereof. Slideably received within the cylinder is a rod 75 having one end projecting rearwardly from the cylinder and attached to the forward end of the drive member. The other end of the rod is attached to a piston 76 disposed within the cylinder and located alongside a flexible diaphragm 77 which divides the cylinder into front and rear chambers. When pressurized air is admitted into the forward chamber, the piston 76, the rod 75 and the drive member 52 are shifted to the left from the position shown in FIG. 3. As air is exhausted from the forward chamber, a coil spring 78 retracts the piston, the rod and the drive member to the right.

When the legs 14 are to be retracted, the shift lever 37 usually is swung counterclockwise to the position shown in FIG. 2 to set the gear box 21 in its high gear-high speed position. Also, the handle 62 is swung counterclockwise to the position shown in FIG. 3 to place the pawl 51 in its active position and the pawl 50 in its inactive position. Pressurized air then is alternately admitted into and exhausted from the forward chamber of the cylinder 74 to advance the drive member 52 to the left and to retract the drive member to the right (FIGS. 3 and 4). As the drive member is advanced, successive teeth of the pawl 51 engage successive teeth of the ratchet 47 and conform to the ratchet teeth so as to turn the ratchet 47 and the gear 46 in a clockwise direction (FIG. 4). The gear 46 rotates the gear 44 and the crankshaft 22 in a counterclockwise direction to effect retraction of the legs 14 at a relatively rapid rate. As the drive member 52 advances to the left, the inactive pawl 50 simply moves idly past the ratchet 45 so as to leave the gear 44 free to be driven by the gear 46. When the drive member is retracted to the right, the pawl 51 moves out of driving engagement with the ratchet 47 and thus both gears momentarily remain stationary until the drive member is again advanced to cause the pawl 51 to drive the ratchet 47 and the gear 46.

To extend the legs 14, the handle 62 is swung clockwise to the position shown in FIG. 5 to place the pawl 51 in its inactive position and to place the pawl 50 in its active position. In most instances, the lever 37 usually will be left in the high gear position as the legs are initially extended so that such extension can be effected at a rapid rate.

Figure 6:
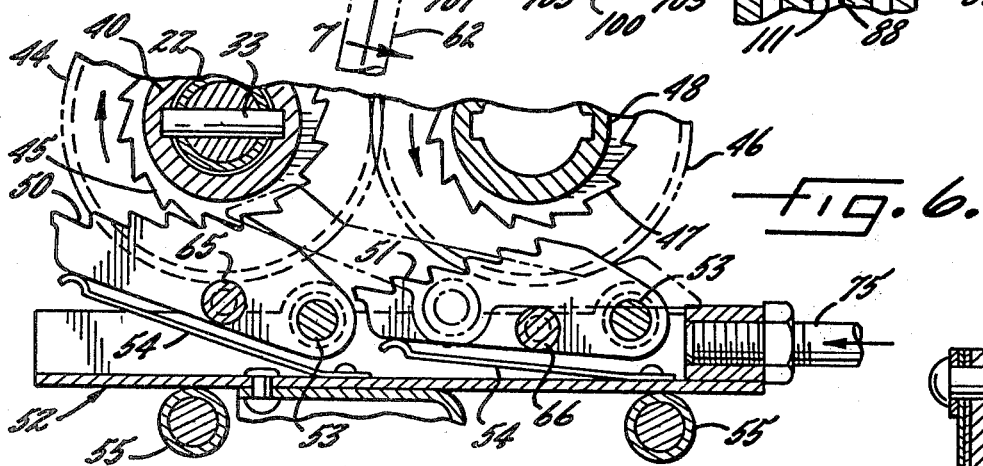
FIG. 6 is a fragmentary view of parts illustrated in FIG. 5 and shows certain parts of the actuator in moved positions as the feet are extended.

As pressurized air is admitted into the cylinder 74 to advance the drive member 52 to the left (FIG. 3), the pawl 50 engages and drives the ratchet 45 to rotate the gear 44 in a clockwise direction (see FIG. 6). Accordingly, the crankshaft 22 is turned in a clockwise direction to extend the legs 14. The inactive pawl 51 moves idly past the ratchet 47 during the advance stroke of the drive member 52, and the gear 46 simply rotates idly. When the drive member is retracted to the right, the pawl 50 shifts out of driving engagement with the ratchet 45 so that both gears are momentarily stationary.

Once the feet 12 contact the ground, the lever 37 may be swung counterclockwise to set the gear box 21 in its low gear-high torque position. Accordingly, with continued actuation of the drive member 52, the high torque necessary to lift the trailer 11 is applied to the cross-shaft 17.

If there is no air supply available to actuate the cylinder 74, the actuator 10 may be manually operated. This is achieved by placing the reversing handle 62 in the desired position, by placing the hand crank with an adaptor thereon (not shown) in the hub 48 and by turning the crank manually in the appropriate direction.

From the foregoing, it will be apparent that the present invention brings to the art a new and improved landing gear actuator 10 in which the reciprocating motion of the drive member 52 is converted into rotary motion for turning the cross-shaft 17 by gears 44 and 46, ratchets 45 and 47 and pawls 50 and 51 which are of relatively simple construction and which are arranged compactly within the housing 30. Simply by pivoting the lever 60, one of the pawls may be activated and the other pawl may be inactivated to enable the direction of rotation to be reversed.

The actuator 10 is provided with a reliable and effective cycle valve 80 (FIG. 9) for automatically effecting the alternate admission and exhausting of pressurized air from the cylinder 74. The cycle valve is controlled by a reliable on-off valve 81 which automatically shuts off the actuator 10 once the legs 14 have been raised to their fully retracted position.

Figure 9:
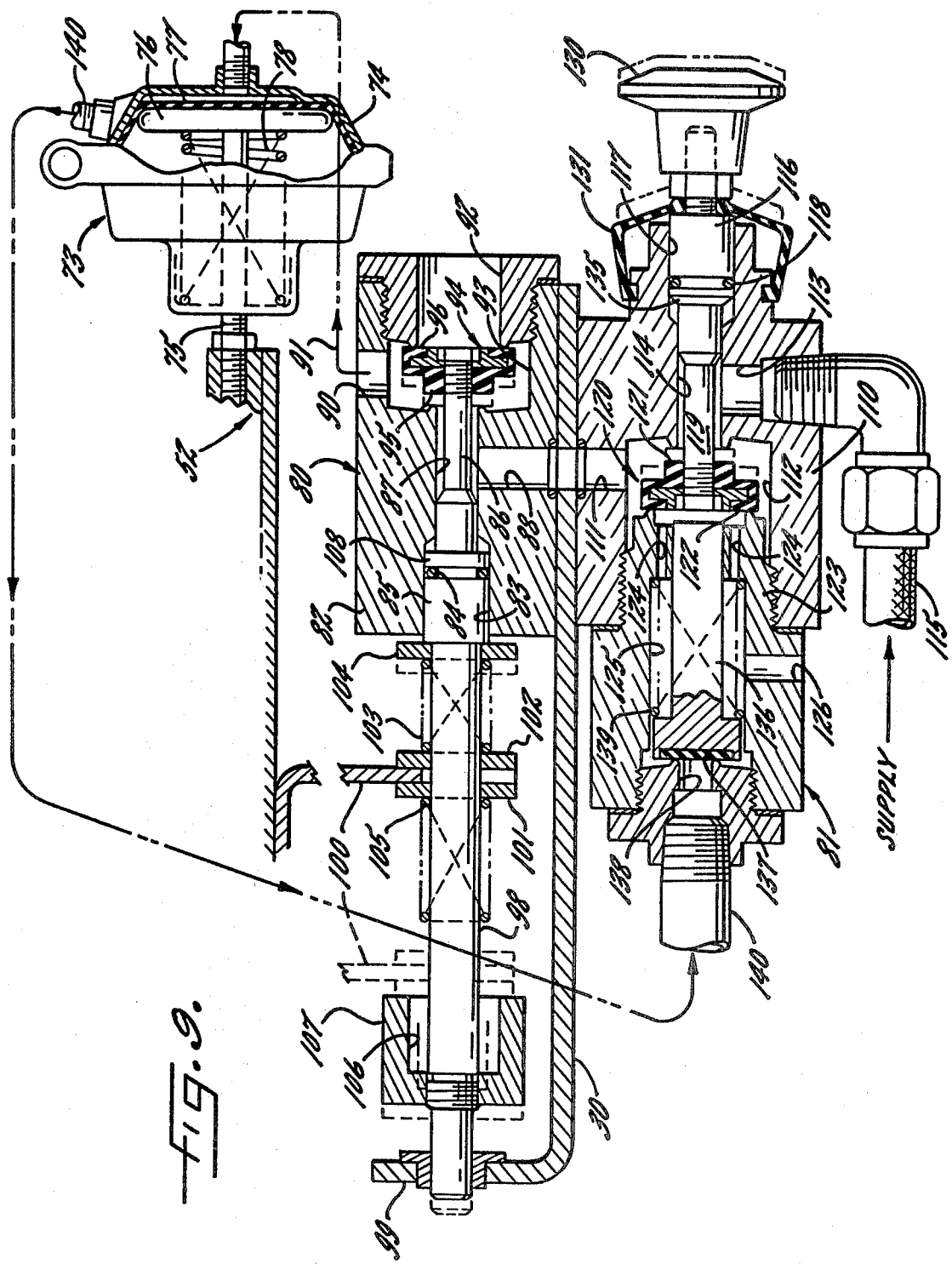
FIG. 9 is a schematic view of the reciprocating pneumatic actuator and the pneumatic flow circuit associated therewith.

As shown in FIG. 9, the cycle valve 80 includes a body 82 which is mounted within the housing 30 on the bottom wall thereof. Slideably mounted within a bore 83 in the body and sealed to the bore by an O-ring 84 is a spool 85 having a forwardly projecting stem 86 of reduced diameter disposed with radial clearance in a passage 87 which constitutes a continuation of the bore. An inlet passage 88 for supply air (e.g., air at a pressure of about 100 p.s.i.) is formed in the body 82 and leads into the passage 87 while an outlet passage 90 leads out of the body and communicates with the forward chamber of the cylinder 74 via a line 91. An exhaust passage 92 also is formed in one end of the body 82 and is open to atmosphere. The passages 87, 90, and 92 are all adapted to communicate with a chamber 93 located adjacent the forward end of the body.

Disposed within the chamber 93 and secured to the stem 86 is an elastomeric valve member 94 having rear and forward faces 95 and 96 whose diameters are larger than the diameters of the passages 87 and 92, respectively. When the valve member 94 is shifted to the right (FIG. 9), the valve face 96 closes off the exhaust passage 92 while the valve face 95 opens up the passage 87 and establishes communication between the supply passage 88 and the cylinder 74 via the chamber 93, the passage 90 and the line 91. Shifting of the valve member 94 to the left results in the valve face 95 closing the passage 87 to cut off the flow of supply air to the cylinder 74 and, at the same time, the valve face 96 opens the passage 92 so that the air in the cylinder may exhaust to atmosphere by way of the line 91, the passage 90, the chamber 93 and the passage 92.

Joined to and extending rearwardly from the spool 85 is a rod 98 (FIGS. 3 and 9) whose rear end portion is slideably supported by an ear 99 which is turned upwardly from the bottom wall of the housing 30. An L-shaped element or bracket 100 (FIGS. 7 and 9) of inverted U-shaped cross-section is secured rigidly to the lower side of the drive member 52, the lower end portion of the bracket 100 being bifurcated and straddling the rod as shown in FIG. 7. The lower end portion of the bracket is sandwiched between two washers 101 and 102 (FIG. 9) which are telescoped slideably over the rod 98. A coil spring 103 is telescoped over the rod and is located between the washer 102 and a third washer 104 which is telescoped slideably over the rod and which abuts the rear end of the spool 85. Another coil spring 105 is telescoped over the rod adjacent the washer 101 and is adapted to enter into a counterbore 106 formed in a block 107 which is attached rigidly to the rear end portion of the rod.

Let it be assumed that the piston 76 of the actuator 73 is fully retracted to the right as shown in FIG. 9 and that pressurized supply air is being delivered to the cycle valve 80 by way of the passage 88. When the piston is fully retracted, the drive member 52 is in a retracted position causing the bracket 100 to act through the washer 102, the spring 103 and the washer 104 to hold the spool 85 in an open position shown in FIG. 9. With the spool thus positioned, the valve face 96 closes the exhaust passage 92 while the valve face 95 opens the passage 87. Accordingly, pressurized air is supplied to the forward chamber of the cylinder 74 by way of the passages 88 and 87, the chamber 93, the passage 90 and the line 91. The piston 76 thus is shifted to the left to advance the drive member 52.

As the drive member 52 advances, the bracket 100 and the washer 101 slide rearwardly along the rod 98 and away from the spring 103 and thus the mechanical force for holding the spool 85 in its open position is removed. The spool remains in that position, however, by virtue of the pressurized air in the chamber 93 acting against the valve face 95 and exerting a rightwardly directed force on the spool. Accordingly, the piston 76 and the drive member 52 continue to advance to the left (FIG. 9).

As the drive member 52 approaches the end of its advance stroke, the spring 105 enters the counterbore 106 in the block 107 and engages the bottom of the counterbore before the washer 101 engages the block. With continued advancement of the drive member, the spring 105 becomes compressed between the washer 101 and the bottom of the counterbore 106. The washer 101 then engages the block 107 and thus the block is forced rearwardly and acts through the rod 98 to shift the spool 85 to the left against the force exerted on the valve face 95 by the pressure in the chamber 93. Accordingly, the valve face 95 moves toward the passage 87 to cut off the flow of supply air to the cylinder 74 and, at the same time, the valve face 96 moves away from and opens the exhaust passage 92. As a result, air is exhausted from the cylinder via the line 91, the passage 90, the chamber 93 and the passage 92 to stop further movement of the drive member 52 to the left. When the valve face 96 first opens the exhaust passage 92, the compressed spring 105 acts between the washer 101 and the block 107 to shift the spool 85 rapidly to the left through its full stroke and thereby insure full opening of the exhaust passage 92 and full closing of the supply passage 87. The spring 78 thus starts retracting the piston 76 and the drive member 52 to the right as viewed in FIG. 9.

Upon initial retraction of the drive member 52, the bracket 100 starts sliding to the right along the rod 98. The washer 101 and the spring 105 follow behind the bracket since, as shown in FIG. 1, the housing 30 and the cycle valve 80 disposed therein are inclined downwardly and to the right and thus gravity causes the washer 101 and the spring 105 to move to the right along the rod 98. As the bracket 100 moves away from the block 107, the mechanical force for holding the spool 85 in its closed position is removed from the rod 98. The spool, however, is held in its closed position by the air pressure in the passage 87. That pressure acts against a land surface 108 formed at the junction of the spool 85 and the stem 86. The area of the land 108 is larger than the effective area of the valve face 95 when that face is sealed against the passage 87. Accordingly, the force developed by the pressure acting on the land 108 to urge the spool 85 to the left is greater than the opposing force developed by the pressure acting on the valve face 95 and thus the spool remains closed as the drive member 52 retracts.

When the drive member 52 approaches the end of its retract stroke, the bracket 100 pushes the washer 102 against the spring 103 which, in turn, compresses against the washer 104 to avoid the imposition of an abrupt shock load. After compressing, the spring 103 tends to act as a rigid link and thus the mechanical force applied to the spool 85 by way of the spring overcomes the pressure acting against the land 108 so that the spool rapidly shifts to the right to its open position (FIG. 9) in order to open the passage 87 and close the passage 92 and thereby initiate another cycle. When the passage 87 is open, the effective area of the valve face 95 is greater than the area of the land 108 and thus the pressure in the chamber 93 tends to force the spool 85 to the right to its open position.

Thus, the cycle valve 80 automatically admits pressurized air into and exhausts pressurized air from the cylinder 74 in timed relation with the movement of the drive member 52 by virtue of the valve being actuated by the drive member as the latter reaches the end of each stroke. The stroke of the drive member is significantly longer than the stroke of the valve spool 85 but the air acting on the surfaces 95 and 108 is utilized to keep the cycle valve 80 either open or closed during travel of the drive member between the ends of its stroke. As a result of the springs 103 and 105, valve shifting is assured and no abrupt shock loads are imposed upon the valve 80 or on the housing 30 when the drive member 52 stops and reverses directions. The cycle valve thus performs in a reliable and non-erratic manner and is capable of experiencing a long service life.

As mentioned above, the on-off valve 81 controls the supply of pressurized air to the cycle valve 80 and shuts off the actuator 73 automatically once the legs 14 are fully retracted. As shown in FIG. 9, the on-off valve 81 includes a body 110 which is mounted beneath the bottom wall of the housing 30 at right angles to the body 82 of the cycle valve 80. An outlet passage 111 is formed in the body 110 and communicates with the inlet passage 88 of the cycle valve 80 to supply pressurized air to the cycle valve, the passage 111 also communicating with a chamber 112 in the body 110. Also formed in the body 110 is a supply passage 113 which communicates with the chamber 112 by means of an axial passage 114 in the body. The supply passage 113 is connected to a line 115 which in turn is connected to a source of pressurized air (e.g., the same source which is used to pressurize the brake system of the trailer).

A spool 116 (FIG. 9) is slideably mounted within a bore 117 in the body 110 and is sealed therein by an O-ring 118. Formed on one end of the spool 116 is a reduced-diameter stem 119 which is received with radial clearance in the passage 114. The stem carries a valve member 120 having valve faces 121 and 122, the valve face 121 being adapted to close the passage 114 to seal that passage from the chamber 112 and the passage 111. The valve face 122 is adapted to seat against the end of a housing 123 and to close off passages 124 formed in the housing and communicating with a chamber 125 therein, the chamber 125 being vented to atmosphere by means of an exhaust passage 126 formed through the housing. The housing 123 is attached to the inner end of the valve body 110.

Attached to the outer end of the spool 116 is a knob 130 (FIG. 9) which may be pushed inwardly to open the valve 81 and pulled outwardly to close the valve. A flexible boot 131 is connected between the valve body 110 and the outer end of the spool 116 to prevent dirt and the like from entering the bore 117.

When the knob 130 is manually pushed inwardly, the valve member 120 is shifted to the left (FIG. 9) to cause the valve face 121 to open the passage 114 and to cause the valve face 122 to close the passages 124. As a result, supply air from the line 115 flows to the cycle valve 80 via the passages 113 and 114, the chamber 112 and the passage 111 to effect operation of the actuator 73. By virtue of the passages 124 being closed by the valve face 122, supply air is prevented from escaping through the exhaust passage 126.

When the actuator 73 is to be turned off, the knob 130 is pulled outwardly (i.e., to the right in FIG. 9) to shift the valve member 120 and cause the valve face 122 to open the passages 124 and, at the same time, to cause the valve face 121 to close the passage 114. As a result of the passage 114 being closed, the flow of supply air to the cycle valve 80 is cut off. Although the pressure of the supply air in the passage 114 acts against the valve face 121 and tends to shift the valve member 120 to the left, that same pressure also acts against a land 135 located at the junction of the spool 116 and the stem 119. The effective area of the land 135 is greater than the effective area of the valve face 121 when the latter is closed and thus the supply air keeps the valve 81 closed. The open passages 124 vent the chamber 112 through the exhaust passage 126 and thus the chamber is free of any pressure tending to open the valve.

To effect automatic closing of the valve 81 when the legs 14 are fully retracted, a plunger 136 (FIG. 9) is disposed within the chamber 125 and its outer end is adapted to momentarily engage the valve face 122 and shift the valve member 120 outwardly (or to the right in FIG. 9) to close the valve 81. Formed on the inner end of the plunger 136 is a head 137 which normally seats against and closes a passage 138 in the inner end of the housing 123. The area of the head 137 is significantly greater than the area of the passage 138. A coil spring 139 is telescoped over the plunger 136 and is compressed between the housing 123 and the head 137 to urge the latter to the left into a closed position relative to the passage 138. The passage 138 communicates with the forward chamber of the cylinder 74 by means of a line 140 which extends between the housing 123 and the cylinder.

When the legs 14 are to be retracted upwardly, the driver of the truck need merely push the knob 130 inwardly to shift the valve member 120 so that the valve face 121 opens the passage 114 and the valve face 122 engages the end of the housing 123 (see FIG. 9). As pressurized air flows to the cylinder 74 to retract the legs 14, the pressure in the passage 114 holds the valve member 120 in the position shown in FIG. 9 since the pressure acts against the relatively large area of the open valve face 121. Accordingly, the driver need not continue to push the knob 130 inwardly to hold the valve 81 open and thus the driver may leave the side of the trailer 11.

Once the legs 14 have been fully retracted, the pressure in the cylinder 74 builds to a value (e.g., 35 p.s.i.) which exceeds the pressure (e.g., 20 p.s.i.) required to advance the drive member 52 when the legs are being retracted. The increased pressure in the cylinder 74 is transmitted to the passage 138 via the line 140 and acts against the head 137 to shift the plunger 136 outwardly or to the right. Once the head opens the passage 138, the pressure in the passage acts against the full area of the head to snap the plunger 136 to the right with a sharp rapid motion. The right end of the plunger strikes the valve face 122 and forces the valve member 120 to the right to close the valve 81 to cut off the flow of pressurized air to the cylinder 74 and to thereby automatically turn off the actuator 73. When the pressure in the cylinder 74 and the line 140 is relieved, the spring 139 forces the plunger 136 back to the position shown in FIG. 9 to close the passage 140. It should be noted that there is no seal between the head 137 and the chamber 125 and thus air in the chamber is free to escape to atmosphere through the vent passage 126 when the spring 139 returns the plunger 136. As a result, there is no danger of air being trapped between the head 137 and the inner or left end of the housing 123 to cause erratic operation of the plunger 136.

During retraction of the legs 14, the air pressure developed in the cylinder 74 is not sufficient to overcome the force of the spring 139 and thus the plunger 136 remains in the position shown in FIG. 9 until the legs reach their fully retracted position and cause the pressure in the cylinder to build up. As the legs are extended, the pressure in the cylinder builds up once the feet 12 contact the ground and start lifting the trailer 11. Accordingly, the driver must manually hold the knob 130 inwardly to keep the plunger 136 from closing the valve 81 until the trailer has been lifted to the desired elevation. As explained previously, however, there is no need for the driver to tend to the valve 81 once retraction of the legs has been initiated.

What is claimed is:

1. An actuator for a landing gear assembly having an extendible and retractable foot and having a rotatable member which extends or retracts the foot in dependence upon the direction of rotation of the rotatable member, said actuator comprising first and second rotatable gears disposed in meshing engagement with one another, one of said gears being adapted for connection to said rotatable member to rotate the latter, first and second one-way ratchet wheels rotatable with said first and second gears, respectively, and having teeth which face in the same direction, first and second pawls associated with said first and second ratchet wheels, respectively, a drive member, means for reciprocating said drive member back and forth through advance and return strokes, said first and second pawls being mounted on said drive member to reciprocate back and forth with the drive member and to move relative to the drive member between active and inactive positions with respect to said first and second ratchet wheels, respectively, each of said pawls being operable to turn its respective ratchet wheel but only when the pawl is in its active position and said drive member is shifted through its advance stroke, and selectively operable means movable between a first position causing said first and second pawls to shift to their active and inactive positions, respectively, and a second position causing said first and second pawls to shift to their inactive and active positions, respectively.

2. An actuator as defined in claim 1 in which said pawls are mounted on said drive member to pivot between said active and inactive positions, resiliently yieldable means acting between said drive member and each pawl and urging the pawl to its active position, said selectively operable means comprising a lever mounted to swing between said first and second positions and having arms for pivoting one of said pawls to its inactive position and releasing the other pawl to pivot to its active position when said lever is swung to one of its positions, said arms pivoting said other pawl to its inactive position and releasing said one pawl to pivot to its active position when said lever is swung to the other of its positions.

3. An actuator as defined in claim 2 further including latch means for releasably holding said lever in each of its positions.

4. An actuator as defined in claim 3 in which said latch means comprise a pair of leaf springs straddling one of said arms and frictionally engaging said one arm.

5. An actuator as defined in claim 1 in which said first and second gears are integral with said first and second ratchet wheels, respectively.

6. An actuator for a landing gear assembly having an extendible and retractable foot and having a rotatable member which extends or retracts the foot in dependence upon the direction of rotation of the rotatable member, said actuator comprising first and second rotatable gears disposed in meshing engagement with one another, one of said gears being adapted for connection to said rotatable member to rotate the latter, first and second toothed wheels rotatable with said first and second gears, respectively, first and second toothed members associated with said first and second wheels, respectively, a linearly movable drive member, means for reciprocating said drive member back and forth through advance and return strokes, said first and second toothed members being mounted on said drive member to reciprocate back and forth with the drive member and to move relative to the drive member between active and inactive positions with respect to said first and second wheels, respectively, each of said toothed members being operable to turn its respective wheel but only when the toothed member is in its active position and said drive member is shifted through its advance stroke, each of said toothed members being profiled to conform with its respective toothed wheel as the toothed member turns the toothed wheel when said drive member is shifted linearly through its advance stroke, and selectively operable means movable between a first position causing said first and second toothed members to shift to their active and inactive positions, respectively, and a second position causing said first and second toothed members to shift to their inactive and active positions, respectively.

* * * * *